(12) United States Patent
Shakouri et al.

(10) Patent No.: US 7,627,841 B2
(45) Date of Patent: Dec. 1, 2009

(54) EFFICIENT METHOD TO PREDICT INTEGRATED CIRCUIT TEMPERATURE AND POWER MAPS

(75) Inventors: Ali Shakouri, Santa Cruz, CA (US); Travis Kemper, Mission Viejo, CA (US); Yan Zhang, Santa Cruz, CA (US); Peyman Milanfar, Menlo Park, CA (US); Virginia Martin Hériz, Santa Cruz, CA (US); Xi Wang, Santa Cruz, CA (US)

(73) Assignee: The Regents of the University of California, Santa Cruz, Oakland, CA (US)

( * ) Notice: Subject to any disclaimer, the term of this patent is extended or adjusted under 35 U.S.C. 154(b) by 213 days.

(21) Appl. No.: 11/787,108

(22) Filed: Apr. 12, 2007

(65) Prior Publication Data

US 2008/0026493 A1 Jan. 31, 2008

Related U.S. Application Data

(60) Provisional application No. 60/791,628, filed on Apr. 12, 2006.

(51) Int. Cl.
G06F 17/50 (2006.01)
H01L 21/66 (2006.01)
(52) U.S. Cl. .............................. 716/4; 438/17
(58) Field of Classification Search ..................... 716/4; 438/17
See application file for complete search history.

(56) References Cited

U.S. PATENT DOCUMENTS 6,424,533 B1 * 7/2002 Chu et al. ................... 361/719
7,191,413 B2 3/2007 Chandra et al.
2003/0115017 A1 * 6/2003 Sun et al. .................... 702/181
2004/0227230 A1 * 11/2004 Chou ......................... 257/712
2006/0031794 A1 2/2006 Li et al.

(Continued)

OTHER PUBLICATIONS

Kaisare, A, et. al. "Design Rule for Minimizing Thermal Resistance in a Non-Uniformy Powered Microprocessor", IEEE 22nd Annual Semiconductor and Thermal Measurement Symposium, Mar, 14-16, 2006, pp. 108-115.*

(Continued)

Primary Examiner—Jack Chiang
Assistant Examiner—Magid Y Dimyan
(74) Attorney, Agent, or Firm—Lumen Patent Firm

(57) ABSTRACT

The temperature distribution associated with a design of an integrated circuit is calculated by convoluting a surface power usage represented by a power matrix with a heat spreading function. The heat spreading function may be calculated from a simulation of a point source on the integrated circuit using a finite element analysis model of the integrated circuit or other techniques. To account for spatial variations on the chip, the heat spreading function may be made dependent on position using a position scaling function. Steady-state or transient temperature distributions may be computed by using a steady-state or transient heat spreading function. A single heat spreading function may be convolved with various alternative power maps to efficiently calculate temperature distributions for different designs. In an inverse problem, one can calculate the power map from an empirically measured temperature distribution and a heat spreading function using various de-convolution techniques. While the forward problem is analogous to image blurring, the inverse problem is analogous to image restoration.

13 Claims, 5 Drawing Sheets

---

700 Calculate heat spreading function $w(s,t)$ for the IC, optionally scaled by position scaling function $p(x,y)$

702 Represent power usage on IC surface by power matrix $f(x,y)$ that associates a power value with each area element $(x,y)$ of the chip surface

704 Calculate temperature distribution $g(x,y)$ by convolving power matrix with heat spreading function, e.g., $g(x,y) = \sum_{(s,t)} w(s,t) \cdot f(x+s, y+t)$

U.S. PATENT DOCUMENTS

2006/0060952 A1* 3/2006 Yuan et al. ................. 257/675

OTHER PUBLICATIONS

Donnelly, D. et al. "The Fast Fourier Transform for Experimentalists. Part II: Convolutions", Compting in Science and Engineering, Jul.-Aug. 2005, pp. 92-95.*

Zhan, Y, et al. "Fast Computation of the Temperature Distribution in VLSI Chips using the Discrete Cosine Transform and Table Lookup", Design Automation Conference, Jan. 2005, pp. 87-92 vol. 1.*

Cheng, Y, et al. "An Efficient Method for Hot-spot Identification in ULSI Circuits", 1999 IEEE/ACM Computer-Aided Design Digest of Technical Papers, Nov. 1999, pp. 124-127.*

* cited by examiner

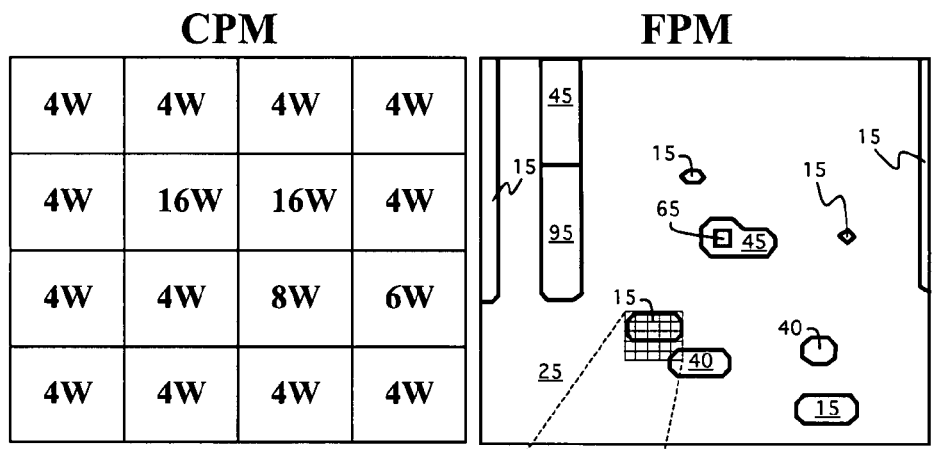
*Fig. 4A*  *Fig. 4B*
*Fig. 4C*
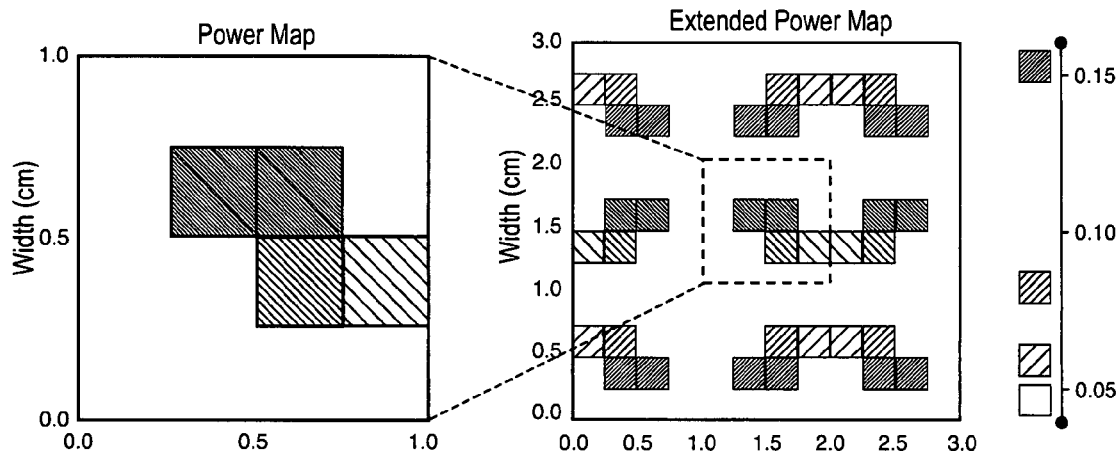

*Fig. 7*

700 Calculate heat spreading function $w(s,t)$ for the IC, optionally scaled by position scaling function $p(x,y)$

702 Represent power usage on IC surface by power matrix $f(x,y)$ that associates a power value with each area element $(x,y)$ of the chip surface

704 Calculate temperature distribution $g(x,y)$ by convolving power matrix with heat spreading function, e.g., $g(x,y) = \sum_{(s,t)} w(s,t) \cdot f(x+s,y+t)$

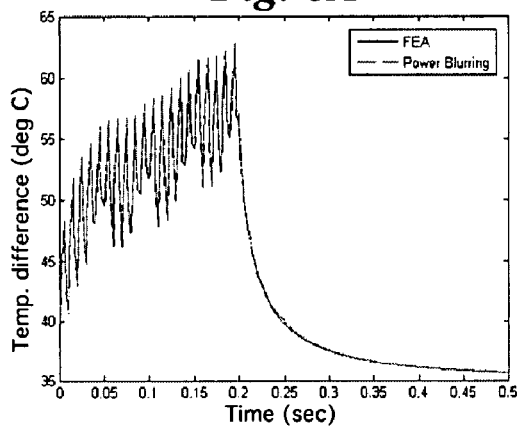

*Fig. 8A*

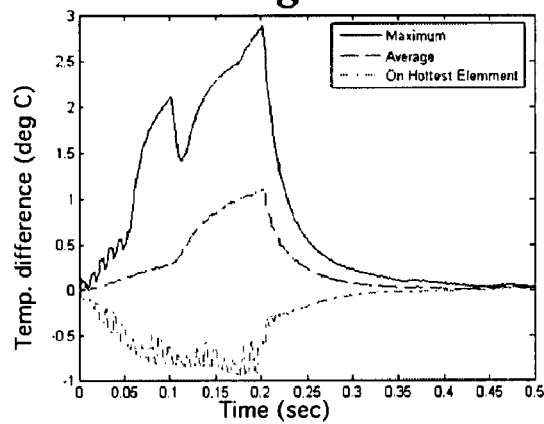

*Fig. 8B*

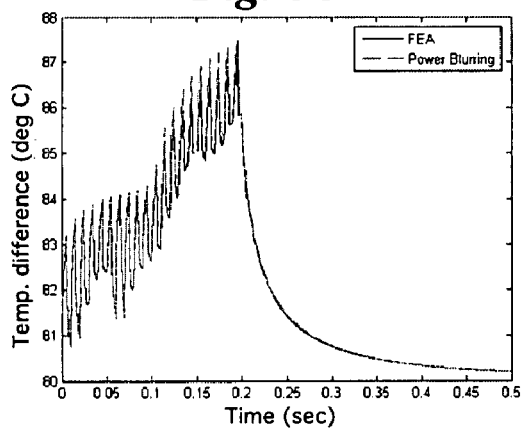

*Fig. 8C*

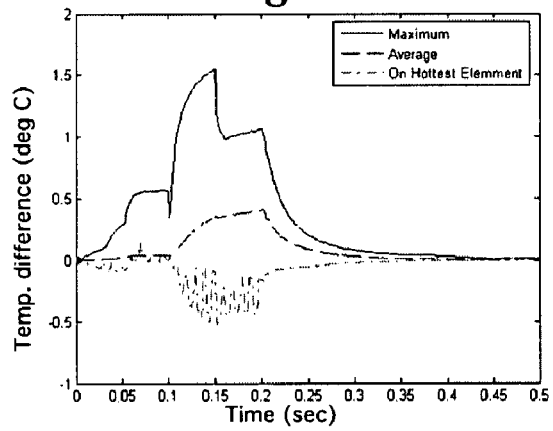

*Fig. 8D*

EFFICIENT METHOD TO PREDICT INTEGRATED CIRCUIT TEMPERATURE AND POWER MAPS

CROSS-REFERENCE TO RELATED APPLICATIONS

This application claims priority from U.S. provisional patent application No. 60/791,628 filed Apr. 12, 2006, which is incorporated herein by reference.

STATEMENT OF GOVERNMENT SPONSORED SUPPORT

N/A

FIELD OF THE INVENTION

This invention relates generally to the design of semiconductor integrated circuits. More specifically, it relates to methods for the efficient computational simulation of temperature and power distributions associated with semiconductor chip designs.

BACKGROUND OF THE INVENTION

As power densities in integrated circuits (ICs) increases with faster clock frequencies and smaller die size, controlling circuit temperatures has become an important aspect of IC design. With increasing temperatures, the sub-threshold leakage power, interconnect delay and crosstalk noise also increase. Furthermore, high temperature operation reduces the lifetime of an IC, and increases the cost of an IC's thermal package. Consequently, efficient thermal design is becoming increasingly important to IC design.

The thermal properties of a proposed IC design may be evaluated by computationally predicting the temperature distribution of the active elements during operation. The temperature distribution allows one to determine the maximum temperatures the chip will endure, and allows designers to exclude designs that exceed the critical junction temperature. This thermal analysis is complicated by the spatial and temporal non-uniform heating found in contemporary microprocessors, resulting in certain regions, known as "hot spots," exceeding the mean operating temperature. Therefore, to identify the extreme temperatures produced by hot spots, it is desirable to calculate a full temperature map of the IC's surface under steady state and transient conditions. The traditional approach in order to calculate the temperature distribution in a given solid involves solving the heat equation with the appropriate boundary conditions. The most common techniques for solving a generic PDE are finite differences and finite elements, which are usually performed in the time or in the frequency domain. However, their accuracy comes at the price of long execution times, and exhaustive CPU and memory usage. From a specified power map of a proposed IC design, current methods, such as finite element analysis (FEA), calculate the resulting temperature distribution using the differential heat conduction equation, $$\rho(\vec{x})c(\vec{x})\frac{\partial T(\vec{x},t)}{\partial t} = H(\vec{x},t) + \nabla_{\vec{x}} \cdot (\lambda(\vec{x})\nabla_{\vec{x}} T(\vec{x},t)) \qquad \text{Eq. 1}$$

where, T, H, $\rho$, c, and $\lambda$ denote temperature, heat flux, mass density, specific heat and thermal conductivity, respectively.

While this method is accurate, it is computationally very time consuming. Consequently, it is not practical for use with a very large number of nodes in a chip, or for use with routing and placement optimization algorithms.

One proposed method is to model an IC as a thermal resistor and capacitor network. This method has been used to accurately predict steady temperature distributions in very large scale integration (VLSI) systems in order to reduce hot spot temperatures. However, this method is limited by the considerable effort necessary to model each sub-region of an IC's surface as a circuit consisting of connections through the package to the heat sink, where each layer's resistance must be found analytically or experimentally. A further limitation of this method is the substantial calculation times associated with solving a complex network and, consequently, its incompatibility with routing and placement optimization algorithms.

Consequently, a faster method to ensure proper thermal design would be a desirable advance in the field of IC chip design. Fast thermal simulations have been explored using a Green's function technique where analytical expansions of the Green's function are used. See, for example, Cheng et al., "An Efficient Method for Hot-spot Identification in ULSI Circuits," Proceedings of the 1999 IEEE/ACM international conference on Computer-aided design 1999. Pages: 124-127.; Zhan et al., "A High Efficiency Full-Chip Thermal Simulation Algorithm," IEEE, pp. 634-637, 2005; and Zhan et al., "Fast Computation of the Temperature Distribution in VLSI chips using the Discrete Cosine Transform and Table Look-up," Proc. 2005 *Asia and South Pacific Design Automation Conference*, pp. 87-92, January 2005. However, because accurate analytical solutions exist only for very simple geometries, it is extremely difficult to obtain analytical solutions with realistic IC design packages having high complexity. As a result, these approaches are of limited use.

SUMMARY OF THE INVENTION

In one aspect, the present invention provides a fast and accurate computational method to predict the surface temperature of an IC. Using the approach of the present invention, referred to herein as "power blurring," the temperature distribution associated with a given multi-element power distribution can be computed with calculation times three orders of magnitude faster than that using FEA and predicted hot spot temperatures within 1° C. as compared to those of FEA for both steady-state and transient thermal simulations. The invention therefore provides significant benefit to the design of an integrated circuit, assisting in the minimization of localized heating and consequently increasing both IC performance and lifetime.

According to one embodiment of the invention, a computer-implemented method for calculating a temperature distribution associated with a design of an integrated circuit includes representing a power usage on the surface of the integrated circuit by a power matrix and convolving the power matrix with a heat spreading function to obtain the temperature distribution. The heat spreading function may be calculated from a temperature profile of a point source on the integrated circuit. The temperature profile may be calculated using a finite element analysis model of the integrated circuit or other techniques. Alternatively, the temperature profile may be empirically determined or measured. To account for spatial variations on the chip, the heat spreading function may be scaled using a position-dependant scaling function. Steady-state or transient temperature distributions may be computed by using a steady-state or transient heat spreading function. A single heat spreading function may be simultaneously convolved with various alternative power maps to efficiently calculate temperature distributions for different designs, e.g., for use in routing or placement optimization.

BRIEF DESCRIPTION OF THE DRAWINGS

FIGS. 4A-B illustrate examples of two types of power maps, course and fine, which may be used in embodiments of the present invention to derive a power matrix.

FIG. 4C shows an original power map (left) expanded by the image principle to obtain the extended power map (right).

FIG. 7 is a flow chart of a method for calculating a temperature map according to an embodiment of the invention.

FIGS. 8A-8D includes graphs comparing transient temperature distributions calculated using a power blurring method and a conventional FEA method for course and fine power maps.

DETAILED DESCRIPTION

A key feature of the present invention is the technique of computing an IC temperature distribution by convolving a power matrix with a heat spreading function, or mask. To better understand this unique approach, it is helpful to recall how convolution is used in the field of image processing for image blurring. The intensity levels of pixels (x,y) of a black and white digital image are represented by a matrix of numerical values, $f(x,y)$. The process of spatial filtering (e.g., blurring) computes a new intensity value g (x,y) of each pixel in an image by convolution of $f$ with another matrix w, known as a mask, to produce the blurred image g. The mask w (s,t) determines how the intensity of each pixel (x,y) is spread to nearby pixels (x+s,y+t). For example, the 3×3 mask $$w(s, t) = \begin{bmatrix} 0.05 & 0.10 & 0.05 \\ 0.10 & 0.40 & 0.10 \\ 0.05 & 0.10 & 0.05 \end{bmatrix}$$

spreads 60% of a pixel's intensity to adjacent pixels, with 10% being spread to adjacent pixels to the right, left, up, and down, and 5% being spread to the four diagonal pixels, while 40% remains with the original pixel at the center. The convolution of an original image $f$ by a mask w is given by the equation $$g(x, y) = \sum_{s=-a}^{a} \sum_{t=-b}^{b} w(s, t) \cdot f(x+s, y+t) \quad \text{Eq. 2}$$

where a=(m−1)/2 and b=(n−1)/2 for an m×n mask. When performing the convolution, an image value $f(x,y)$ is taken to be zero for any index (x,y) outside of the defined image space.

Similarly, in the technique of the present invention, the heat transfer process on the surface of an IC is calculated by a convolution of a matrix representing the power usage on the surface of an IC with a mask representing a heat spreading function. Using this power blurring technique, an accurate temperature distribution can be computed very quickly.

The top surface of the IC under study is divided into a regular grid of N×M elements. The method will calculate a N×M matrix representing the temperature distribution, where each point represents the temperature at a given location of the chip. For simplicity, we first describe the method assuming the IC is treated as a single region. In this case, a heat impulse response (or heat spreading function) is calculated at a point of the IC (e.g., the center) and convoluted with an N×M matrix representing the power usage on the IC. For a given IC mount, the same heat spreading function can be used with different power usage functions to calculate temperature distributions for different IC designs with the same mount. We note that the size of the rectangular grid (here chosen as N×M) is up to the user. Larger values of N×M result in more precise spatial resolution in the calculated maps, at modestly increased computational complexity.

Figure 1:
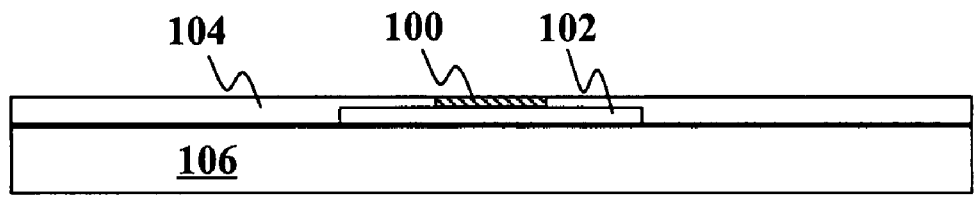
FIG. 1 is a schematic cross-sectional diagram of an FEA package model of an IC used to calculate a heat spreading function from a simulation of a point source on the IC according to an embodiment of the invention.

In one embodiment, the heat spreading function (i.e., mask) may be calculated from a simulation of a point source on the integrated circuit using a finite element analysis model of the integrated circuit or other techniques. The point spread function can be calculated with full 3D finite element simulations for a point source on a specified IC package design. For example, consider a flip chip package as shown in FIG. 1. In this model, a silicon IC 100 with dimensions 1 cm×1 cm is centrally positioned on an integrated copper heat spreading layer 102 and surrounded by a copper package lid 104. These layers all rest on a copper heat sink 106. The die horizontal surface was orthogonally meshed with congruent elements 0.025 cm×0.025 cm to facilitate matrix representation. Heating resulting from transistor usage on the IC surface can be calculated using standard FEA simulation software to simulate heat fluxes applied to the IC surface.

To create a mask, the discrete temperature impulse response of the system is determined via the application of an approximate delta function power using FEA software. For example, in the model shown in FIG. 1, a simulated 6,250 W/cm$^2$ heat flux may be applied to a single 6.25×10$^{-4}$ cm$^2$ element in the center of the simulated IC to obtain a steady-state temperature distribution. The resulting temperature distribution is then normalized by the total amount of simulated power applied, with units of ° C/W, to obtain a heat spreading function for a point source.

Figure 2:
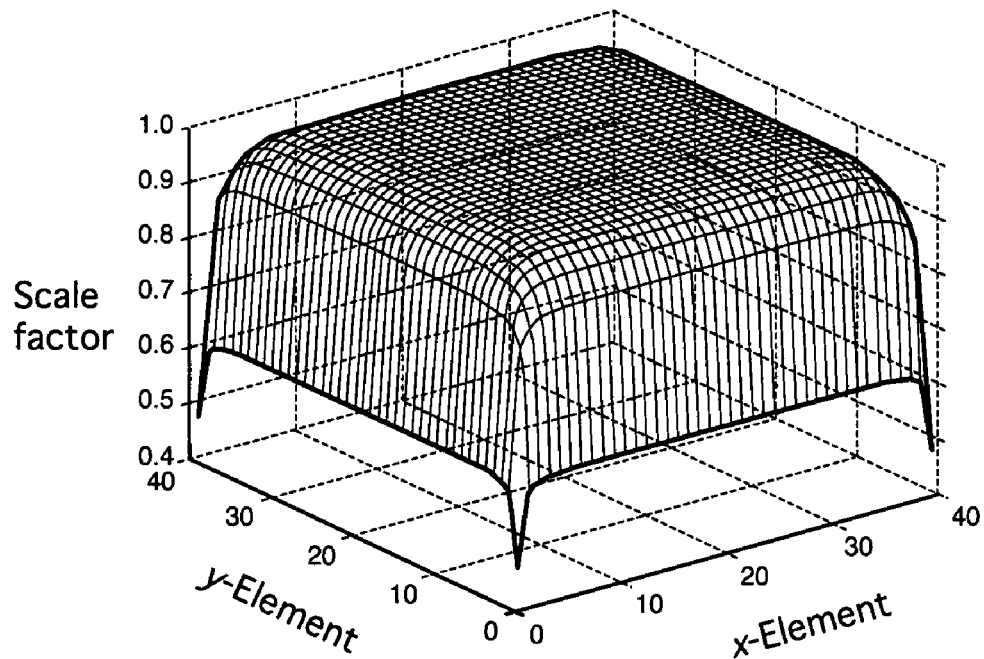
FIG. 2 is a graph of a position scaling function used to scale a uniform heat spreading function to obtain a parameterized heat spreading function for an IC surface according to an embodiment of the invention.

Since the major part of the heat spreading happens in the silicon substrate, the shape of the point spreading function does not depend on the specific package. The spreading function of an element is, however, dependent on its position on the chip surface. Elements closer to the edge experience less heating per unit energy than elements closer to the interior of the IC, due to their proximity to the highly thermal conductive copper package lid 104. To account for this boundary effect, the heat spreading function may be made position-dependent by scaling around the boundaries according to a position scaling function, p (x,y). This position-dependent scaling function can be found by using FEA or by simple analytical approximations. For example, the FEA calculated temperature distribution from a uniform heat source everywhere on top of the chip can be used to extract the scaling function. FIG. 2 is a graph of an exemplary position scaling function, showing the scale factor as a function of element indices on the IC surface. The heat spreading function is made into a position-dependent function by simple point-wise multiplication with the scaling function, i.e., w (s,t,x,y)=p (x,y) w (s,t). The convolution equation then becomes:

$$g(x, y) = \sum_{s=-a}^{a} \sum_{t=-b}^{b} w(s, t, x+s, y+t) \cdot f(x+s, y+t).$$

Equivalently, the position dependence of the heat spreading may be taken into account by modifying the convolution equation to include the scaling function, as follows:

$$g(x, y) = \sum_{s=-a}^{a} \sum_{t=-b}^{b} w(s, t) \cdot p(x+s, y+t) \cdot f(x+s, y+t).$$

It should be noted that the above convolutions may be efficiently calculated using a fast Fourier transform rather than multiplication. It is well known that the Fourier transform of the convolution of two functions is equal to the product of each function's Fourier transform. Thus, we can first calculate the Fourier transform of functions w(s,t) and p(x+s,y+t)× ƒ(x+s,y+t). Then we multiply the two Fourier transforms and perform an inverse Fourier transform on the result. This will give us g(x,y).

Alternatively, the IC surface may be divided into contiguous regions and a different heat spreading function may be used for each region. Transitional regions with interpolated heat spreading functions can be used to smooth the transitions.

A power dissipation map ƒ(x,y) may be obtained by various models of power usage of the IC chip design. For example, FIG. 4 shows a coarse power map (CPM) and a fine power map (FPM). The CPM power distribution models the IC surface by dividing it into congruent areas, each with a corresponding power. In the example shown in FIG. 4(a), the 1 cm×1 cm chip area is divided into sixteen 0.25 cm×0.25 cm elements, where each has a corresponding power value assigned to it to represent the power applied. The specific values assigned are selected depending on the chip design. The power matrix for this particular CPM is a 4×4 matrix, $$f(x, y) = \begin{bmatrix} 4 & 4 & 4 & 4 \\ 4 & 16 & 16 & 4 \\ 4 & 4 & 8 & 6 \\ 4 & 4 & 4 & 4 \end{bmatrix},$$

where each value has units W/cm². The power matrix may be much larger for a fine-grained map having many elements. For example, the FPM in FIG. 4(b) divides the IC surface into much finer regions to produce a 40×40 grid of elements, each 0.025 cm×0.025 cm. Again, each region has a corresponding power dissipation value assigned to it, determined from the particulars of the floor plan layout of the IC design. The power matrix in this case is a 40×40 matrix containing values 15, 25, 40, 45, 65, and 95 at elements corresponding to the regions in FIG. 4(b) labeled with these numerals.

By convoluting the power matrix ƒ with the heat spread function w in accordance with the present power blurring technique, a temperature distribution g for the chip surface is obtained. An overview of one implementation of this power spreading method is shown in FIG. 7. At step 700 the heat spreading function w for an IC is calculated. This step may also include calculation of a position scaling function p. The power usage on the IC surface is then represented in the form of a power matrix ƒ in step 702. In step 704 the temperature distribution map g for the IC surface is calculated by convolving the power matrix ƒ with the heat spreading function w. Optionally, this convolution may take into consideration the position scaling function p.

Figure 3:
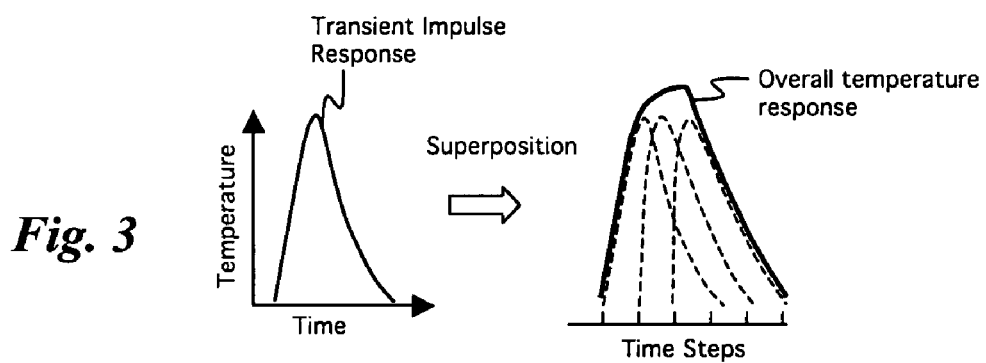
FIG. 3 illustrates the superposition of transient impulse responses to obtain an overall response according to an embodiment of the invention.

With the particular heat spreading function described above, the resulting temperature distribution represents the steady-state solution. For transient thermal analysis, a transient heat spreading function (i.e., mask) is computed and then convolved with a power matrix, resulting in a temperature distribution at each moment in time. To generate the transient mask, the thermal impulse response of a single element may be divided into incremental steps in the time domain to produce a time-dependent mask representing the spatial temperature spreading function. For example, an approximate delta function in space and in time may be applied using FEA in order to characterize the transient impulse response of the system. The resulting transient temperature distribution is then normalized and used as a basis to form the transient masks. In order to create the transient response of a long pulse, the basis mask may be superimposed with time-shifted copies to form a power profile with the same duration as the pulse being modeled, as shown in FIG. 3. Once a mask for a specific pulse duration is created, it can be convoluted with the power map to create the time-dependent temperature profile.

For transient analysis, it is possible to simulate a single pulse excitation and also multiple frequency excitations. For the single pulse analysis, a square wave power dissipation with a specified time period (e.g., 1 s) may be applied to the entire surface of the chip using a small calculation time step (e.g., 25 ms). A mask of the appropriate duration may then be created by superimposing the base masks in the time domain according to FIG. 3. Then, at each discrete time step, the mask is convolved with the power distribution to produce the transient temperature distribution.

For the multi-frequency case, different regions may be pulsed with different frequencies. The IC area is subdivided into regions, and a temperature distribution is separately computed for each region using a particular pulse frequency for each region. The temperature distributions for the regions are then combined to produce a composite temperature distribution for the entire IC area. For example, a basis mask may be created from a single pulse with a small time step (e.g., 1 ms). This basis mask is then superimposed with time-shifted copies to create pulse durations concurrent with each desired frequency. The temperature response for each region is then convolved with the power map for that region to produce the temperature distribution associated with that region. After all the regional temperature distributions are compiled, they are superimposed in space to produce the final temperature distribution.

Because the heat spread function is determined independently from the determination of the power dissipation map, a single heat spreading function may be determined once for a given IC package and then convolved with various power maps representing different possible floor plans of the IC design to obtain corresponding temperature maps. Thus, this approach is extremely useful when different floor plans of the IC chip are investigated, or when temperature-aware routing and placement optimization is done. For example, an optimization routine could vary routing and placement parameters of the design, compute a power map for the altered design, and compute a corresponding temperature map using the same heat spreading function. Using an iterative optimization technique, the design parameters could be varied in order to minimize or reduce the peak temperatures of one or more thermal hot spots.

Another parameter of IC design that may be adjusted is chip area. When the maximum temperature calculated for a proposed chip is too high, one way to reduce the heat flux is to expand the IC's area. Using prior FEA techniques, expanding the area requires a new set of simulations where full meshing or new resistive network are necessary. Using the present power blurring technique, however, the modeled IC's area may be easily expanded by as much as a factor of two or more. For example, steady-state hot spot temperature was within 1.1° C. of FEA simulations for a 125% increase in geometry. Similar results are obtained for the single pulse and multi-frequency transient cases.

Those skilled in the art will appreciate that the power spreading methods of the present invention may be applied or adapted to other IC designs, such as a stacked chip geometry. Those skilled in the art will also appreciate that the computation of the power map may use fitted functions or other techniques, and is not limited to FEA. The methods of the invention may also be implemented in dynamic thermal management to approximate hot spots on an operating IC.

It should also be pointed out that the various techniques of the invention described above may be applied to one or more regions of an IC surface, and are not necessarily applied in all cases to the entire IC surface. More specifically, an IC area may be divided into multiple contiguous regions (e.g., center, edges, corners, and transitional regions). The methods of the present invention can then be applied to one or more regions to calculate temperature maps for those regions. The resulting map can then be combined (e.g., by interpolation) with temperature maps for the other regions to obtain a complete temperature map for the entire surface of the IC. Not all the temperature maps in such a hybrid approach are necessarily calculated using the techniques of power blurring.

If there is no thermally conductive medium around the silicon die, the point heat spreading function can be significantly different near the edges and corners. Finding the position scaling function could become computational expensive. One can use the symmetry of the problem and expand the power distribution on the chip based on the mirror images at various boundaries near the chip edge. For example, FIG. 4C shows an original power map (left) expanded by the image principle to obtain the extended power map (right). Convolving the extended power map with the point spreading function will allow one to calculate the temperature map and take into account the chip boundaries quite accurately.

Those skilled in the art will also appreciate that the above methods generalize in a straightforward manner from two dimensions to three dimensions. In particular, a three dimensional temperature distribution associated with a design of a three dimensional integrated circuit may be calculated by representing a power usage in the volume of the integrated circuit by a three dimensional power matrix and convolving the power matrix with a three dimensional heat spreading function to obtain the three dimensional temperature distribution.

Figure 5A:
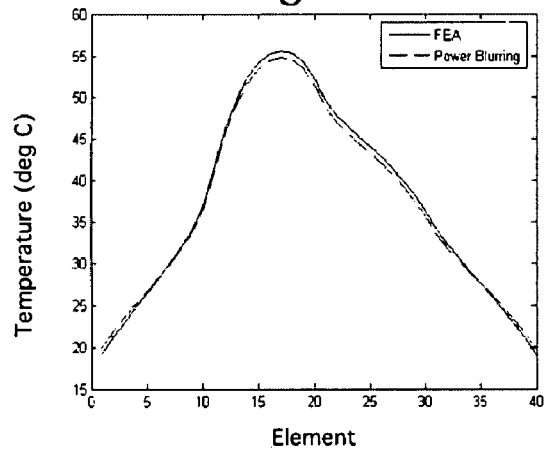
FIGS. 5A-5D includes four graphs comparing temperature distributions of exemplary IC designs computed using a power blurring method and a conventional FEA method.
Figure 5B:
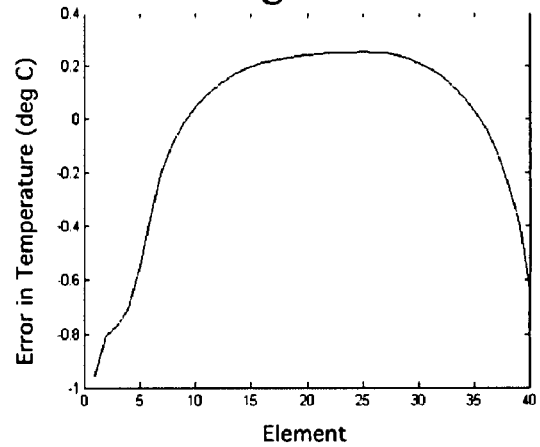
Figure 5C:
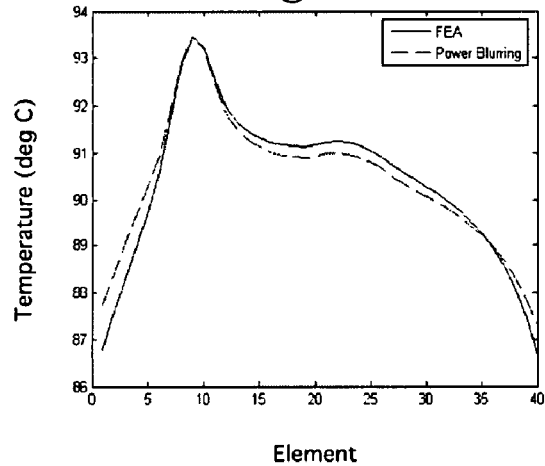
Figure 5D:
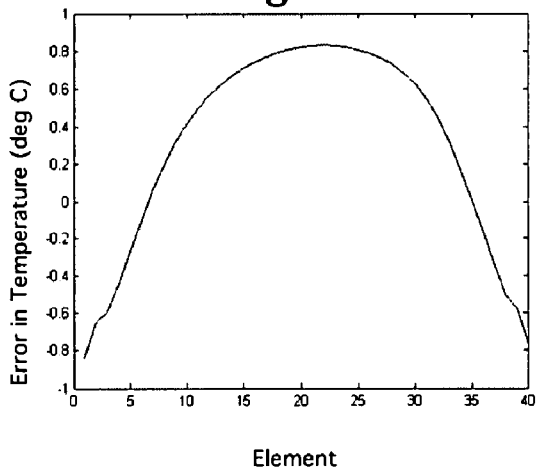
Figure 6A:
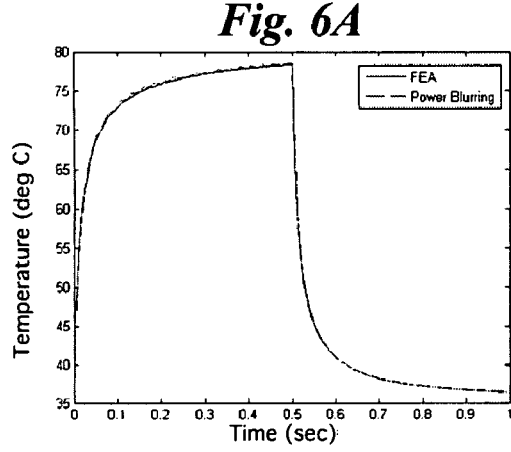
FIGS. 6A-6D includes four graphs comparing transient temperature distributions of exemplary IC designs computed using a power blurring method and a conventional FEA method.
Figure 6B:
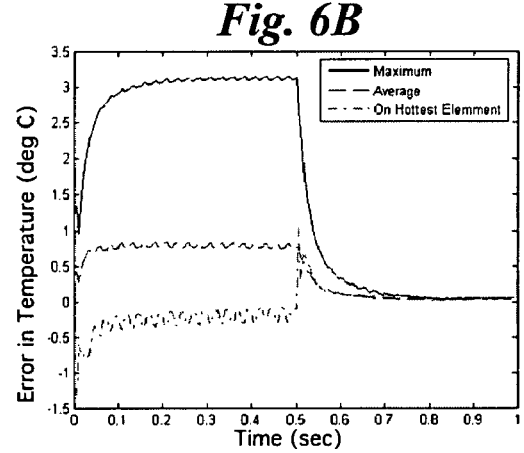
Figure 6C:
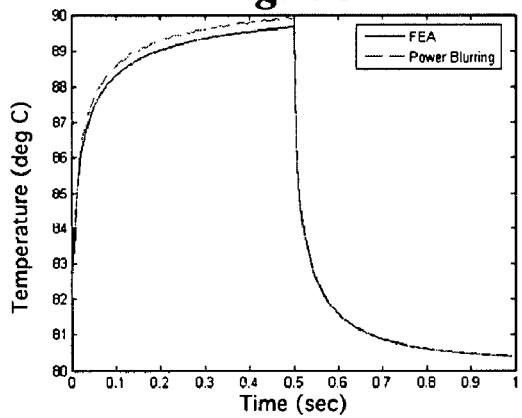
Figure 6D:
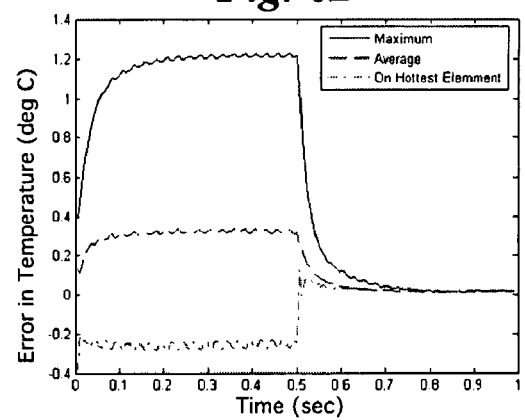

The advantages of the present invention will now be illustrated by comparing the power blurring technique with the conventional FEA technique for the exemplary IC designs modeled with both CPM and FPM, as shown in FIG. 4(a) and 4(b), respectively. FIG. 5(a) is a graph the cross-sectional steady-state temperature distributions computed by the two techniques for the CPM case. FIG. 5(b) is a graph of the discrepancy error between the two temperature distributions, where the error is defined by $$\mathrm{Error}(x, y) = \frac{g_{PB}(x, y) - g_{FEA}(x, y)}{g_{FEA}(x, y)} \qquad \text{Eq. 3}$$

where $g_{PB}(x,y)$ is the temperature of the element (x,y) predicted by power blurring and $g_{FEA}(x,y)$ is the temperature on that element as predicted by FEA. Similarly, FIG. 5(c) is a graph of the cross-sectional steady-state temperature distributions computed by the two techniques for the FPM case, and FIG. 5(d) is a graph of the discrepancy error between the two. In each case, power blurring was able to accurately predict the location and temperature of the hotspot with a computation time more than 3000 times faster than FEA.

The graphs in FIG. 6 compare the transient temperature at the hot spot element as calculated by power blurring and by FEA for both CPM and FPM cases. FIG. 6(a) is a graph of the transient hot spot temperatures for the CPM case, and FIG. 6(b) is a graph of the error between the two. Similarly, FIG. 6(c) is a graph of the transient hot spot temperatures for the FPM case, and FIG. 6(d) is a graph of the error between the two. The transient hot spot temperatures have maximum errors of less than 12% in both cases with a computation time 700 times faster.

Comparisons of the two methods for the transient, multi-frequency cases are shown in the graphs of FIG. 8. The transient temperatures calculated with FEA and with power blurring at a hot spot element for the CPM case are graphed in FIG. 8(a), and their difference is graphed in FIG. 8(b). Similarly, the transient temperatures calculated with FEA and with power blurring at a hot spot element for the FPM case are graphed in FIG. 8(c), and their difference is graphed in FIG. 8(d). For the CPM case, the regions of 16 W were driven at 100 Hz, the region of 8 W was driven at 20 Hz, the region of 6 W was driven at 10 Hz and the regions of 4 W were driven at 5 Hz. For the FPM case, the regions of 95 W/cm² and 65W/cm² were driven at 100 Hz, the regions of 45 W/cm² and 40 W/cm² were driven at 20 Hz, the region of 15 W/cm² was driven at 10 Hz and the regions of 25 W/cm² were driven at 5 Hz. The power blurring technique produce results comparable to those of FEA with computation times hundreds to thousands of times faster.

The above description demonstrated that the temperature distribution may be calculated by convoluting a power map with a heat spreading function. This forward model also has an inverse, i.e., calculating the power map from an empirically measured temperature distribution and a heat spreading function (calculated using the techniques described earlier). While the forward problem is analogous to image blurring, the inverse problem is analogous to image restoration. Because the empirically measured temperature distribution involves error or noise, the convolution equation has an additive noise term n(x,y):

$$g(x, y) = \left[\sum_{s=-a}^{a} \sum_{t=-b}^{b} w(s, t) \cdot f(x+s, y+t)\right] + n(x, y) \quad \text{Eq. 4}$$

A maximum likelihood (ML) estimate of the power distribution $f$ may be obtained by a least-squares approach that minimizes the square of the noise term n in Eq. 4 above. However, this solution is not stable (i.e., small deviations in the noise can result in large perturbations in the power distribution). Accordingly, a regularization term is needed to provide a stable solution. The present technique exploits a regularization term called bilateral total variation (BTV). Such a maximum a posteriori (MAP) cost function, which consists of the maximum likelihood term plus the regularization term, provides the analog of image restoration. The regularization term consists of a regularization parameter $\lambda$ multiplied by a measure of localized variation in the power distribution with respect to shifts in position. More specifically, the norm of the difference between the power distribution and a shifted power distribution can be calculated for various localized shifts in position, and then these normed differences can be combined in a weighted sum using a scalar weighting factor that decreases in magnitude for larger spatial displacements. Using this MAP cost function, a steepest descent solution for the power distribution can be calculated.

The invention claimed is:

1. A computer-implemented method for calculating a temperature distribution associated with a design of an integrated circuit, the method comprising:
    representing by the computer a power usage on the surface of the integrated circuit by a power matrix;
    calculating by the computer a heat spreading function from a temperature profile of a point source on the integrated circuit; and
    convolving by the computer the power matrix with the heat spreading function to obtain the temperature distribution.

2. The method of claim 1 wherein the temperature profile is derived from a measurement of an empirical temperature profile from a point heat source on the integrated circuit.

3. The method of claim 1 further comprising calculating by the computer the temperature profile from a simulation of a point source on the integrated circuit.

4. The method of claim 3 wherein the temperature profile is calculated using a finite element analysis model of the integrated circuit.

5. The method of claim 1 wherein the heat spreading function is scaled using a position scaling function.

6. The method of claim 1 further comprising calculating a separate heat spreading function for each of multiple regions of the surface of the integrated circuit.

7. The method of claim 1 wherein the heat spreading function represents a steady-state heat spreading.

8. The method of claim 1 wherein the heat spreading function represents a transient heat spreading.

9. The method of claim 1 wherein the power distribution on the chip is expanded based on the mirror images at various boundaries near the chip edge.

10. The method of claim 1 wherein the calculated temperature distribution is scaled based on the temperature distribution from a uniform heat source everywhere on top of the chip.

11. The method of claim 1 wherein the power matrix represents power usage on a region of the surface of the integrated circuit, and wherein the heat spreading function represents a heat spreading on the region of the surface of the integrated circuit.

12. The method of claim 1 wherein convolving the power matrix with the heat spreading function comprises using a fast Fourier transform.

13. A computer-implemented method for calculating a three dimensional temperature distribution associated with a design of a three dimensional integrated circuit, the method comprising:
    representing by the computer a power usage in the volume of the integrated circuit by a three dimensional power matrix; and convolving by the computer the three dimensional power matrix with a three dimensional heat spreading function to obtain the three dimensional temperature distribution.

* * * * *